J. A. DAHLBERG.
TENSION REGULATOR.
APPLICATION FILED SEPT. 20, 1915.
1,216,084.
Patented Feb. 13, 1917.
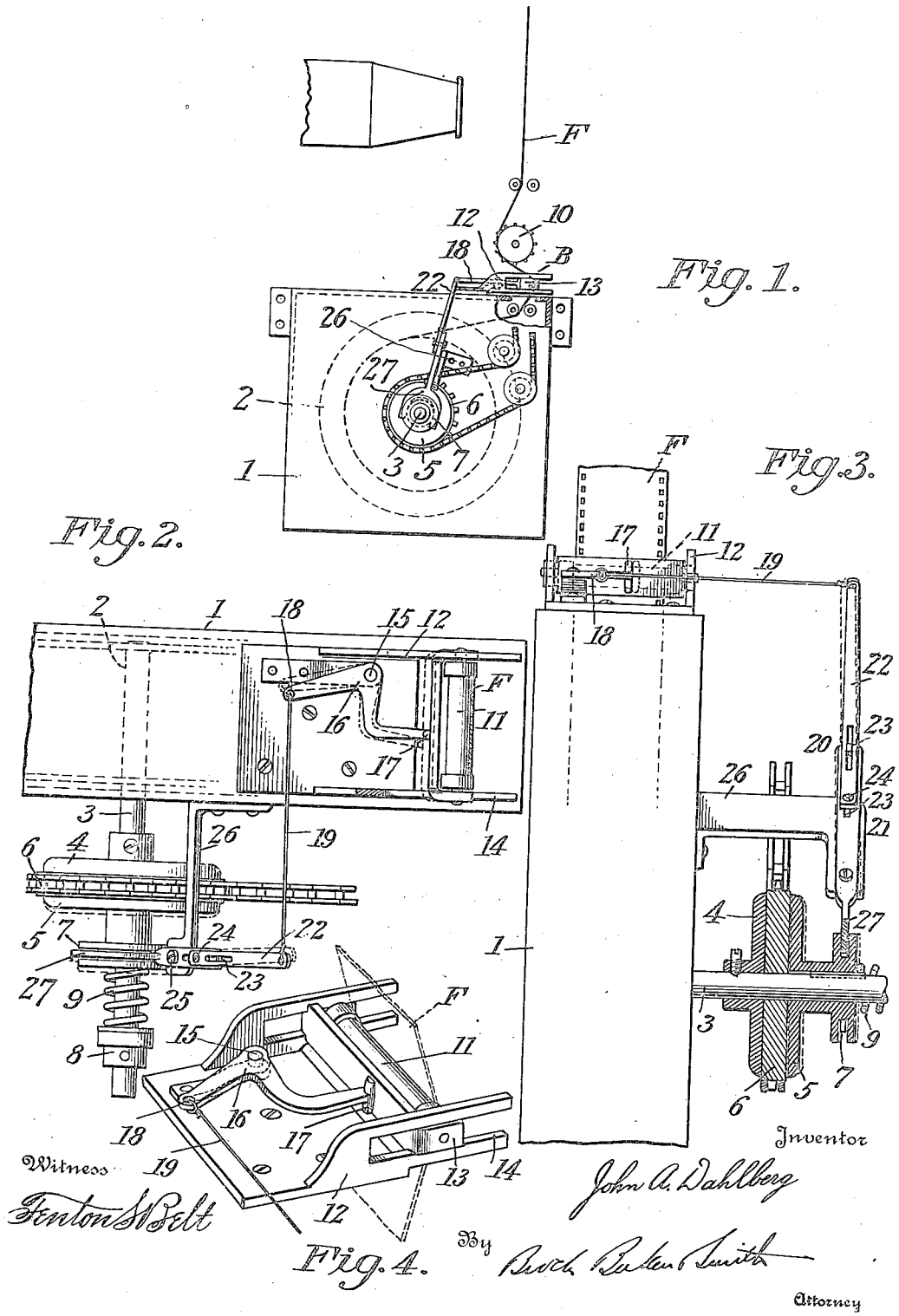
Witness
Fenton S. Belt
Inventor
John A. Dahlberg
By Burch, Butler & Smith
Attorney

UNITED STATES PATENT OFFICE.

JOHN A. DAHLBERG, OF BROOKLYN, NEW YORK.

TENSION-REGULATOR.

1,216,084.  Specification of Letters Patent.  Patented Feb. 13, 1917.

Application filed September 20, 1915.  Serial No. 51,561.

*To all whom it may concern:*

Be it known that I, JOHN A. DAHLBERG, a citizen of the United States, residing at Brooklyn, New York, have invented certain new and useful Improvements in Tension-Regulators for Moving-Picture Machines, of which the following is a specification.

A principal object of the invention is to practically eliminate breakage of the film which is frequently caused by excessive or irregular tension upon the film between the lower magazine and the exposure mechanism. The tension on this part of the film is increased as the diameter of the film wound upon the spool in the lower magazine increases. At the same speed this causes a much stronger pull upon the film. To prevent breakage due to these causes I provide a spring-actuated friction clutch intermediate the spool shaft and its driver, a clutch operating device and a film engaged roller which engages the film in such manner as to cause a bend therein under constant pressure. Tension upon the film tends to cause the bend therein to straighten out and this tendency acts, through the roller and clutch actuating device upon the clutch, to relieve the pressure of the spring and permit the clutch to slip more or less in accordance with the film tension.

I will now describe, in connection with the accompanying drawing, one exemplifying embodiment of the invention, but it is to be understood that the invention is capable of embodiment in other forms and I do not limit myself to details except as claimed hereafter. Figure 1 is a side elevation of sufficient parts of a moving picture machine to illustrate the application of the invention thereto. Fig. 2 is an enlarged top plan of the parts included in the invention. Fig. 3 is a view from the left of Fig. 2, partly in section and partly in elevation. Fig. 4 is a perspective detail of the film engaged tension device.

Reference character 1 designates the lower magazine containing film spool 2, driven by shaft 3. Fixed on this shaft is a friction plate 4, and connected to the shaft by a spline which permits axial movement is a friction plate 5. Between these plates is mounted freely on the shaft a driver 6 which, in this embodiment, is a sprocket to be driven by a chain, but might be a pulley for belt drive or a gear for gear drive. The invention, as will appear, is adaptable to any form of drive.

The movable friction plate is provided with an annular groove 7 to be engaged by the fork of a lever mentioned hereafter. Outwardly on shaft 3 is a collar 8, which may be adjustable if desired. A clutch spring 9 is compressed between this collar and the movable friction plate. Normally, therefore, the spring causes the driver 6 to be frictionally gripped between the plates 4 and 5.

The exposure of film driving mechanism usually comprises a sprocket 10 located somewhat above the lower magazine. The driving of the lower reel is to take up film after it leaves this lower sprocket or other final element of the exposure mechanism and the variations in tension which it is desired to compensate for occur between this sprocket, or similar part of the machine, and the lower reel. I therefore establish a bend in the film as at B, or other suitable point, between the point 10 and the reel and this is accomplished by providing a roller 11, Fig. 4, slidably mounted in suitable frame 12 conveniently placed upon the top of the lower magazine. The roller is rotatably mounted in a yoke 13, which slides in guides 14. Pivotally mounted on the frame 12 at 15 is a bell crank 16, of which one arm has a member 17 movably engaging the yoke 13. The other arm 18 of the bell crank is connected by a suitable link 19 which may, as shown, be a cord or wire, to the upper end of the clutch lever which will now be described. The clutch lever 20 is usually adjustable to provide a variable leverage and for this purpose it may be made in two parts 21 and 22, connected by suitable pin and slot connections 23, of which at least one is provided with a bolt 24, so that when the lever is adjusted for proper length the parts may be securely fastened together. This composite lever is fulcrumed at 25 upon an arm 26 secured to the magazine. The lower end of the lever is provided with a fork 27, engaging groove 7 in movable clutch member 5, previously mentioned. The upper end of the lever is connected with the link 19.

With the parts properly adjusted the constant pull on the film causes it to exert at all times a certain or constant pressure at the bend B upon roller 11 and this pressure is transmitted through yoke 13, bell crank 16, link 19 and lever 20 to movable clutch member 5. This pressure opposes the pressure of spring 9. As the tension on the film increases, due to the increasing diameter of the mass of film upon the reel or due to jerks in driving, the pressure of spring 9 will be opposed more strongly. In other words, the pressure of friction plates 4 and 5 upon the driver 6 will be reduced more or less, depending upon the film tension and proper slipping will be permitted so that undue strains are not transmitted to the film and breakage is substantially eliminated. The arrangement is such that all play between the parts is taken up at all times by the continuous tension exerted by the bend in the film. The mechanism thus resists the pressure of spring 9 more or less at all times and automatically and immediately compensates for changes in the film tension.

In actual use the mechanism has been found to be extremely sensitive and reliable in its action.

I claim:

1. In automatic tension mechanism, the combination with a magazine, film spool and spool shaft, of a friction plate fixed on said shaft, another friction plate splined on the shaft for end movement, a drive sprocket free on the shaft between said plates, a clutch spring for the movable plate, a film tension device comprising a roller engaging the film so as to maintain a bend therein under constant pressure, a movable mounting for the roller, a bell crank actuated by the roller, a lever engaging the movable friction plate and a link connecting the lever with said bell crank.

2. In an automatic tension mechanism, the combination with a magazine, spool shaft and a film winding spool rigidly mounted on the shaft, of a disk rigidly mounted on said shaft, another disk slidably mounted on the shaft, a continuously driven member loosely mounted on the shaft between said disks for driving the spool shaft, a bracket mounted on the side of said magazine, a lever pivotally connected intermediate its ends to said bracket and connected at its lower end to said sliding disk, a roller slidably mounted on said magazine for maintaining a bend under constant pressure in the film, a bell crank mounted on said magazine for forcing said roller toward the film, a link connecting the bell-crank to the upper end of the lever, and a coil spring mounted on said shaft for forcing the slidable disk toward the continuously driven member.

JOHN A. DAHLBERG.